United States Patent [19]

Harris et al.

[11] Patent Number: 5,593,702
[45] Date of Patent: Jan. 14, 1997

[54] UNDERWATER PELLETIZER HAVING SHROUD ELEMENT MOUNTED TO DIE FACE

[75] Inventors: Ronald D. Harris, Houston; Robert B. Wood, Bellville, both of Tex.

[73] Assignee: Shell Oil Company, Houston, Tex.

[21] Appl. No.: 572,913

[22] Filed: Dec. 15, 1995

[51] Int. Cl.⁶ .................................................. B29B 09/06
[52] U.S. Cl. ........................... 425/67; 264/142; 425/168; 425/313; 425/464
[58] Field of Search ........................... 425/67, 313, 311, 425/464, 168, 196; 264/142

[56] References Cited

U.S. PATENT DOCUMENTS

| | | | |
|---|---|---|---|
| 3,317,957 | 5/1967 | Heston et al. | 425/67 |
| 3,467,987 | 9/1969 | Foster | 425/313 |
| 4,059,206 | 11/1977 | Ellwood | 425/311 |
| 4,251,198 | 2/1981 | Altenburg | 425/67 |
| 4,529,370 | 7/1985 | Holmes et al. | 425/313 |
| 4,621,996 | 11/1986 | Hundley, III | 425/67 |
| 4,728,275 | 3/1988 | DiLullo et al. | 425/313 |
| 4,874,307 | 10/1989 | Comper et al. | 425/313 |
| 5,143,673 | 9/1992 | Grimminger | 425/313 |
| 5,403,176 | 4/1995 | Bruckmann et al. | 425/185 |

FOREIGN PATENT DOCUMENTS 57-6713    1/1982    Japan .................................... 264/142

Primary Examiner—Robert Davis
Attorney, Agent, or Firm—Grace Tsang

[57] ABSTRACT

An improved underwater pelletizer adapted to prevent extruded material from agglomerating in an pelletizing assembly, which pelletizer includes a cutting assembly having (1) a shroud fixedly mounted to the surface of the recess in the center of the die ring thereby preventing pellets from being trapped between the die face and the cutting assembly; and (2) novel knives contoured to conform in their angular positions to the curvature of the shroud.

13 Claims, 2 Drawing Sheets

UNDERWATER PELLETIZER HAVING SHROUD ELEMENT MOUNTED TO DIE FACE

FIELD OF THE INVENTION

This invention relates to underwater thermoplastic pelletizers and, in particular, to underwater pelletizers having improved means for cutting thermoplastic strands into pellets. This invention also relates to an improved method for preventing extruded material from agglomerating in an pelletizing assembly. This invention further relates to an improved process for producing pellets of thermoplastics, particularly ultra low melt viscosity polyolefins.

BACKGROUND OF THE INVENTION

The pelletization of extrudable materials is of considerable importance for many applications. Pellets, unlike ingots or bars, readily flow in measuring and dispensing apparatus and the size of pellet charges can be readily controlled to small tolerances. Moreover, unlike powders, they do not form dust and are not ingested by persons working with them. Thus, they provide a highly convenient form for the packaging, storage and use of many thermoplastic polymers, food products, etc.

Underwater pelletizers are known which employ a rotating disc cutter to cut or sever stranded polymer as it exits from the die plate of an extruder. The cutting is accomplished in a chamber full of circulating water which functions to cool the strand and also to carry away the cut pellets. The prior art disc cutters are of two types: (1) knives which extend radially from a central hub or (2) multiple blades which are attached to spoked hubs.

Attempts to use the prior art disc cutters to pelletize extrudable materials such as fluidic materials which require a relatively long time to solidify have resulted in agglomeration of extruded materials in the pelletizers. The extruded materials often are trapped in the area between the cutting hub and the die face and agglomerates into "trashouts". The extruded materials also agglomerate and wrap around the extended knife blades.

It is known that ultra low melt viscosity polymers are useful for the production of a variety of products such as adhesives, sealants, coatings, non-woven fabrics by melt blown fiber processes, injection-molded components made at a high rate, etc. An ultra low melt viscosity polymer has a melt viscosity of about 300,000 centipoise (hereinafter "cps") or lower. The melt viscosity of an ultra low melt viscosity polymer can be as low as 500 cps or smaller.

Pelletization of thermoplastic polymers, especially high melt flow thermoplastic polyolefins, have been particularly difficult using prior art underwater pelletizers. This problem is especially eminent in the production of ultra high melt flow and ultra low viscosity adhesive grade butene-1-ethylene copolymers which contains from about 0.1 to 8 wt % of ethylene which are cracked by a free radical generator. The problem appears to relate to the slow crystallization rate of these polymers which exhibit extreme tackiness in pelletizing. It is known that as the pellets leave the cutting blades, they are very tacky and collide with other pellets to form agglomerates. With a longer residence time, the pellets change to an opaque color, as they complete their crystallization, become dense and lose their tackiness. Excessive turbulence around the trailing edges of the knives also contribute to the agglomeration problem. These agglomerates wrap around the cutting blades and create smears and chunks, plugging the pelletizer chamber, the spin dryer and the area between the die and hub. The extrusion line has to be shut down in order to clean the plugged section resulting in undesirable production interruptions. The agglomerations also result in an excess amount of non-uniform or malformed pellets which may be described by terms such as tailed pellets, long-string pellets, pellet marriages, elbows, dog bones, and pellet trash which are undesirable.

Referring to FIG. 1 and FIG. 2, U.S. Pat. No. 4,621,996, issued Nov. 11, 1986, and assigned to Gala Industries, proposes a conventional underwater plastic pelletizing machine which includes a number of flat cutting blades 21 mounted on a spoked hub 23 on a driven shaft 25 so that the extruded strand of plastic will be cut into a plurality of pellets. The cutting blades 21 proposed project outward, according to the drawing, from the spoked hub 23. There is a gap 29 between the spoked hub and the die face. This cutter design would not process a high melt flow, adhesive grade polymer properly because polymer smears in long strands and wraps around the cutting blades 21 and sharp edges on the hub 23. This is particularly true when the polymer processed has a relatively low viscosity, high tackiness and long crystallization time which make underwater pelletizing very difficult. It is known that excessive turbulence around the trailing edges of the knives also contributed to the wrapping problem.

It is also known that the extruded polymer pellets are entrapped in the gap 29 between the die face 31 and the hub creating smears and chunks, and thus plugging up the pelletizer. It is not practical to use this prior art pelletizer to pelletize adhesive grade ultra high melt flow polybutene-1-ethylene described above because of the frequency of shut downs required for cleaning up the plugged section.

As used herein, a high melt viscosity polymer is a polymer having a melt viscosity 1,000,000 cps or more; and an ultra low melt viscosity polymer is a polymer having a melt viscosity of about 300,000 cps or lower. A polymer with a melt viscosity of about 300,000 cps will have a melt index of approximately 100 dg/min, and is generally regarded as an ultra high melt flow rate polymer with an ultra high melt index. As used herein, the melt viscosity is measured by Brookfield Viscometer using ASTM D2556 at 350 degrees Fahrenheit (°F.), unless otherwise specified e.g. as measured at 275° F. As used herein, the melt flow rates or melt indices are measured by ASTM 1238 condition E at 190° C. and 2.16 kg wt.

OBJECT OF THE INVENTION

Therefore an object of this invention is the provision of a novel pelletizer which will prevent extruded material from agglomerating in a pelletizer.

Another object of this invention is the provision of a novel underwater pelletizer which produces thermoplastic polymer pellets, especially low viscosity and high melt flow polymer pellets, with high quality yet avoiding agglomeration in various agglomerate inviting sites such as the gap between the die face and the cutting hub, the sites where the cutting blades are mounted, around the cutting blades, the area between the inner surface of the cutting blades and the hub, etc.

Still another object of this invention is the provision of a novel process for pelletizing thermoplastics, particularly ultra low melt viscosity polyolefins, which process involves pelletizing thermoplastic material utilizing an underwater thermoplastic pelletizers will prevent extruded material from agglomerating in a pelletizer.

Another further object of this invention is the provision of a novel process which produces thermoplastic polymer pellets, especially low viscosity and high melt flow polymer pellets, with high quality yet avoiding agglomeration in various agglomerate inviting sites such as the gap between the die face and the cutting hub, the sites where the cutting blades are mounted, around the cutting blades, the area between the inner surface of the cutting blades and the hub, etc.

The above and other objects are accomplished by novel features of the present invention which will become apparent from the following description, having reference to the annexed drawings.

SUMMARY OF THE INVENTION

In accordance with the present invention, the problems and disadvantages of the prior art pelletizer, as described above, are avoided or at least minimized by providing a pelletizing assembly for pelletizing an extruded material, said pelletizing assembly comprising:

an extrusion die plate comprising:
- a die face at downstream side of the die plate;
- a die ring formed on the downstream side of the die face having a wear surface projecting outwardly from the die surface to form a recess in the center of the die ring, and said recess having a bottom surface facing the inner surface of said hub; and
- a plurality of channels extending from upstream side of the die plate and the die ring to the die face adapted to deliver the extruded material from the upstream side of the die plate to the die face for extrusion, and said channels forming orifices in the die ring for extruded material to exit the die plate;

a rotatable multi-bladed cutting assembly adjacent the die face, said cutting assembly comprising:
- a circular hub attachable to a shaft having a center axis of rotation and rotatable coaxially in spaced relation to the die face, said hub having an inner surface facing the die face, an outer surface adjacent the shaft, and an outer periphery,
- a plurality of cutting blades affixed to the hub for rotation therewith, said cutting blades having cutting edges for movement adjacent the wear surface of the die ring, said cutting blades engage the surface of the die ring at an angle selected from about 10° to about 60°, said cutting blades having cutting edges parallel to plane of rotation of the hub, the width of the cutting edges of the cutting blades being substantially equal to that of said die ring;

and
a shroud either in the shape of a skirt or a cup fixedly mounted to the recess in the center of the die ring, said shroud having an outer diameter substantially equal to an inner diameter of said die ring, an interface being established between the shroud and the inner surface of the hub which permits free rotation of the cutting assembly and forms a barrier to prevent pellet migration into the space between the hub and the bottom surface of said recess on the die face, and at least a portion of the shroud at the side facing the hub being wearable against the inner surface of the hub as the cutting assembly is advanced toward the die to compensate for the wearing of the cutting blades, optionally at least a portion of the shroud at the side facing the hub being thinner than the remaining portion of the shroud, and optionally a portion of the hub at the inner side facing the die has a portion with a smaller diameter thereby creating a recess or a shoulder, said shoulder is designed to be sealingly interfacing with the shroud to prevent pellet migration into the space between the hub and the bottom surface of the center of the die ring;

wherein said cutting blades having inner surfaces contoured to conform in their angular positions to curvature of the outer periphery of the shroud and the outer periphery of the hub and are held in minimum clearance with the outer periphery of said shroud and the outer periphery of the hub thereby substantially eliminating the gap between the inner surfaces of cutting blades and the outer periphery of the shroud and the outer periphery of the hub;

wherein said cutting blade has an outside edge contoured substantially concentric to the inner edge so that the width of the cutting edge remains constant as the cutting element wears.

The invention also provides a process and a method for preventing material from agglomerating in a pelletizing assembly using the pelletizer described above.

The foregoing and other aspects, features and advantages of the present invention will be apparent from the specification which follows.

DESCRIPTION OF THE EMBODIMENTS

The present invention in its broadest scope relates to a pelletizing assembly having a first surface on the extrusion die plate corresponding to a second surface on the cutting assembly such that an interface is established between the cutting assembly and the extrusion die which permits free rotation of the cutting assembly and forms a barrier to prevent pellet migration between the die face and the hub and/or agglomerate inverting sites. The first surface can be a barrier element. In the alternative, the second surface can be a barrier element.

Figure 1:
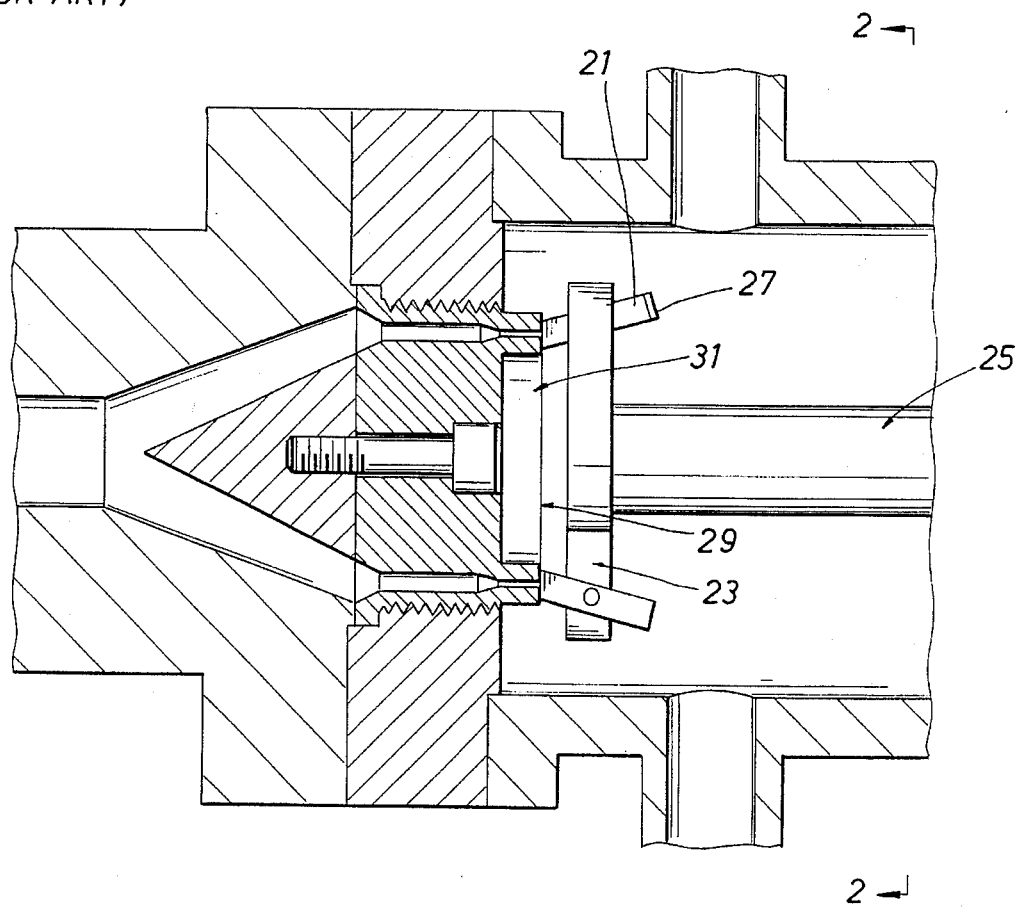
FIG. 1 is a vertical sectional view of the prior art underwater pelletizer, disclosed in U.S. Pat. No. 4,621,996, with flat cutting blades mounted on a spoked hub secured on a driven shaft. There is a gap between the spoked hub and the die face.
Figure 2:
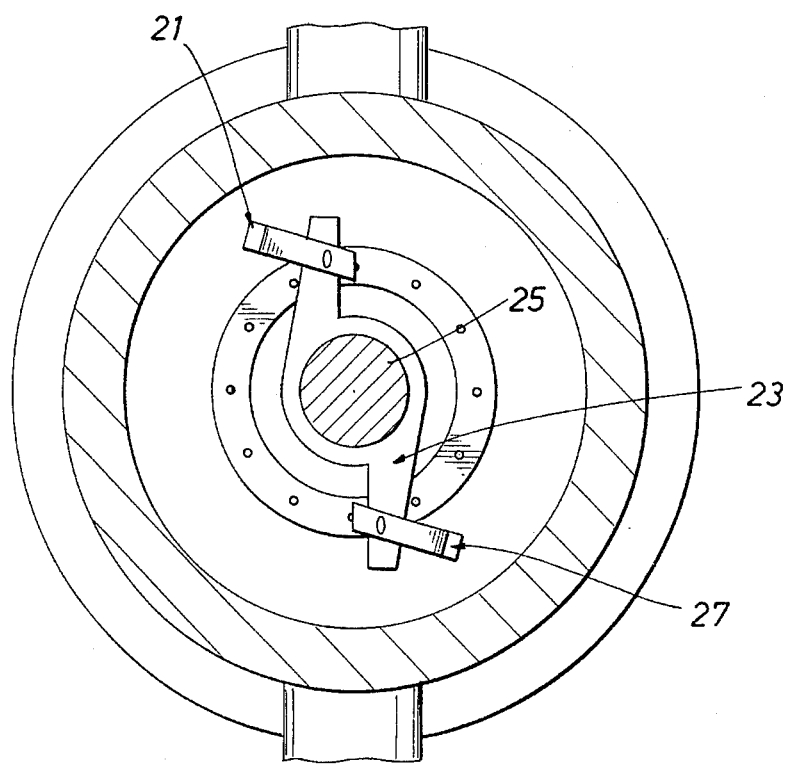
FIG. 2 is a front view on the line 2—2 of FIG. 1 of the prior art underwater pelletizer disclosed in U.S. Pat. No. 4,621,996.
Figure 3:
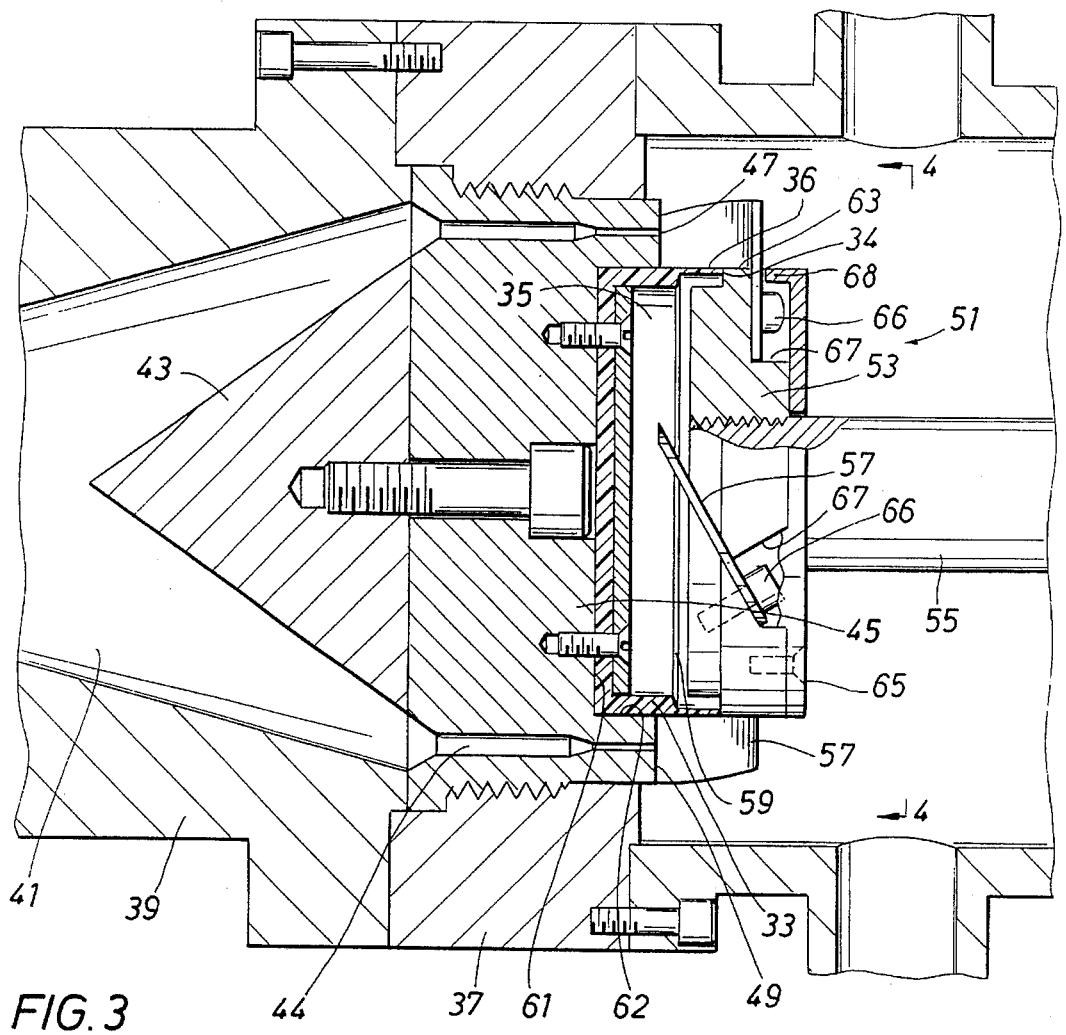
FIG. 3 is a vertical sectional view of a pelletizer of the first specific embodiment of the present invention having a cup-shaped shroud fixedly mounted to the recess in the center of a die ring. The shroud is held to a minimum clearance to the inner surface of the hub to effect a barrier against pellet migration. The cutting blades are contoured to conform to the outer periphery of the shroud and hub thereby eliminating any gaps between the cutting blades and the outer periphery of the cutting hub and the shroud.
Figure 4:
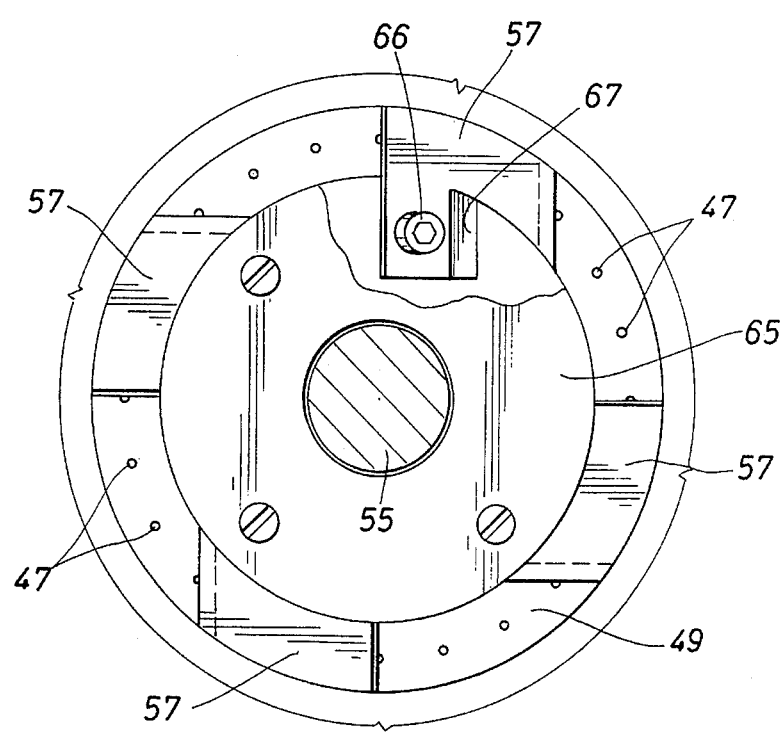
FIG. 4 is a front view of FIG. 3, viewing from the side furthest from the die, illustrating the arrangement of the shaft, cutting hub, die ring and cutting blades according to a first specific embodiment of the present invention.

Referring to FIGS. 3–4, the present invention further relates to the use of a shroud 33, fixedly mounted on the surface of the recess in center of the die ring to prevent agglomeration in various agglomerate inviting sites in the pelletizer such as the gap 35 between the die face and the cutting hub, the sites where the cutting blades are mounted, areas around the cutting blades, the area between the inner surface of the cutting blades and the hub and shroud, etc.

The present invention will be described and illustrated by the following embodiments, which are provided for illustration purpose only and not intended to limit the scope of the instant invention.

Reference is first made to FIGS. 3–4 which illustrate an improved underwater pelletizer according to the first embodiment of the present invention.

Referring to FIG. 3, the pelletizer comprises, in substance, a die plate 37 having a plurality of circumferentially spaced and radially disposed bores or recesses which receive electrically operated heating cartridges for heating the die plate in a well known manner. The die plate can also be steam heated via channels formed in the die. The adaptor 39 and the die plate 37 include an inlet passageway 41 for extrudable material such as thermoplastic polymer which is diverted by a nose cone 43 through a plurality of channels 44 so that the extrudable material is extruded in a continuous ribbon or strand from the orifices 47 of the die face 45 which is the downstream side of the die plate. The die face 45 is provided with a wearable surface forming a circular die ring 49 projecting outwardly from the die face toward the hub, i.e. elevated or raised from the die face. Since the wearable surface on the die ring is elevated or projecting outwardly from the die face, it forms a recess or a bowl shaped cavity 35 which invites agglomeration of the pellets. The die ring 49 has a width which is substantially equal to that of the cutting edge of the cutting blades 57 thereby establishing an even wear of the cutting edge of the cutting blades and the die ring, as cutting blades 57 are wearing against the die ring 49 during the pelletizing operation. When the cutting edge of the cutting blades 57 are wider than the die ring, the cutting edge of the blades would not wear evenly. This can lead to a "crowning" of the inside and/or outside edges of the die and possible damage to the die plate body as the knives wear into softer material. When the cutting edge of the cutting blades are narrower than the die ring, there would be a groove formed on the die ring over which a new cutting blade 57 may not track properly on the die ring.

Associated with the wearable surface, formed on the die ring 49, is a multi-bladed rotatable cutting assembly 51. The cutting assembly 51 includes cutting blade(s) 57 mounted on a circular hub 53 for rotation. The hub is attachable to a shaft 55 (see FIGS. 3–4) having a center axis of rotation and rotatable coaxially in spaced relation to the die face 45, i.e. having a space between the die face and the hub, so that the extruded ribbon or strand of material will be cut into a plurality of pellets. The sizes and dimensions of all the parts depend upon the size of the pelletizers. The number of cutting blades mounted on the cutting assembly also varies with the type and size of the pelletizer, non-limiting range of the number of blades is from 1 to about 500.

As a specific aspect of the first embodiment of the present invention, a protective cup-shaped shroud element 33 is fixedly mounted on the surface of the recess or bowl-shaped cavity in the center of the die ring to prevent agglomeration in various agglomerate inviting sites in the pelletizer. The outer diameter of the shroud 33 is substantially equal to the inner diameter of the die ring 49. The downstream edge 34 of the shroud facing the hub is held to a minimum clearance with the inner face of the hub. The outer periphery 36 of the shroud is held to a minimum clearance to the inner surface of the cutting blades. These special features of the shroud effect a barrier against pellet migration between the die face and the hub, and also permit free rotation of hub. In pelletizing operations, the cutting blades rotate with the hub following the die ring as the track and allowing the cutting edges of the cutting blades 57 to be in close contact with the wear surface of the die ring 49.

In a non-limiting example of the hub design of the first specific embodiment of the present invention, the inner surface of the hub 59 is downstream from the cutting plane of the cutting blade and thereby forming a gap 35 between the inner surface of the hub 59 and the bottom surface 61 of the recess. The shroud substantially covers the bottom surface 61 and side surface 62 of the bowl-shaped recess or cavity 35 thereby preventing the pellets from entering the recess or cavity 35 and the space under the hub.

In a prior art pelletizer, without the shroud, the pellets, especially high melt flow thermoplastic polymers having slow crystallization rate, tend to agglomerate within the gap or chamber between the inner surface of the hub and the bottom surface of the recess. The present shroud 33 forms a seal or barrier thereby effectively prevents the pellets from entering the gap between the inner surface of the hub 59 and the bottom 61 surface of the recess thereby substantially prevents pellet recirculation under the hub, thus eliminating agglomeration of the pellets in the gap and the inner surface 59 of the hub. The cutting blades are bolted on the outer (downstream) side of the hub which is preferably covered by a back cover, thus there are no notches, slots or screw heads for the polymer to hang on.

As a specific embodiment of the first embodiment of the present invention, at least a portion of the shroud at the side facing the hub being wearable against the inner surface of the hub as the cutting assembly is advanced toward the die to compensate for the wearing of the cutting blades. Optionally at least a portion of the shroud 34 at the side facing the hub being thinner than the remaining portion of the shroud thereby reducing the amount of scrap material generated from the wear of the shroud; and optionally a portion of the hub at the inner side facing the die has a portion with a smaller diameter thereby creating a recess or a shoulder 63, said shoulder 63 is designed to be sealingly interfacing with the shroud 33 to prevent pellet migration into the space 35.

The shroud is made of any suitable material. Where the shroud is wearable, it is preferred that the shroud is made of a material compatible with the material for making the pellets. Non-limiting examples of such materials include polyethylene, polypropylene, Teflon, Nylon, phenolic resin, polyacrylic polymer, polyester, polycarbonate, etc.

The cutting blades 57 are mounted to the hub, preferably to the outer/downstream side of the hub and rotate during a pelletizing operation in close contact with the downstream surface of the die ring 49. Optionally, there is a back cover 65 fixedly attached to the hub thereby effectively preventing the agglomeration of the pellets around the mounting bolts or screws 66. Optionally, the hub at the downstream side, facing the die, is recessed at the outer periphery to accommodate the mounting bolts 66 for holding the cutting blades 57; and the back cover 65 optionally has an extension 68 which extends into the recess 67 which accommodates the cutting blades 57 so as to prevent pellet migration and agglomeration in the recess 67 and around the mounting bolts or screws 66.

The cutting blades 57 engage the surface of the die ring at an angle selected from about 10° to about 60°, preferably from about 20° to about 40°, and still more preferably from about 30° to about 36°. A low incident angle not only enables a clean cut, instead of smearing, of the extrudate but also minimizes turbulence in the surrounding cooling water. Turbulence in the cooling water is undesirable because it results in sharp changes in flow directions which tends to both distort still molten pellets and can lead to pellet recirculation and agglomeration in stagnant areas. The low incidence angle used in the present cutting assembly also reduces or eliminates the cavitation zone that forms in the zone behind the cutting blades. Other prior art blunt designs with higher incidence angles may lead to the formation of a vapor pocket on the trailing edge of the knives. This vapor pocket rotates with the blades and acts as an insulating medium between the surrounding cooling water and the face of the die ring. As a consequence, the die face of this other prior art blunt design runs hotter than if cooling waster was in contact with the die, thereby increasing the likelihood of smearing of the extruded material and producing non-discrete pellets.

The cutting blades of the present invention have cutting edges parallel to the plane of rotation of the hub. The width of the cutting edge of the cutting blade is substantially equal to that of the die ring, and the cutting blades have inner edges contoured to conform in its angular position to the curvature of the outer periphery of the shroud and the outer periphery of the hub and are in continuous contact with the outer periphery of said shroud and hub thereby substantially eliminating the gap between the inner surface of the cutting blade and the outer periphery of the shroud and the outer periphery of the hub. The outside edges of the cutting blades are contoured substantially concentric to the inner edges so that the width of the cutting edges remain constant as the cutting blades wear.

In a second embodiment of the present invention, a shroud element 33 is in a form of a skirt-like annular ring or liner fixedly mounted to the inner surface of the die ring, i.e. the surface the bowl-shaped cavity/recess, especially the side surface 62 of the cavity/recess.

Similar to the shroud described in the first embodiment of the present invention, the skirt-shaped shroud element has an outer diameter substantially equal to the inner diameter of said die ring. The downstream edge 34 of the shroud facing the hub is held to a minimum clearance with the inner face of the hub. The outer periphery 36 of the shroud is held to a close tolerance to the inner surface of the cutting blades. These special features of the shroud effect a barrier against pellet migration between the die face and the hub, and also permit free rotation of hub. Other features are similar to that described in the first embodiment of the present invention.

As an illustrative example, in operation, hot thermoplastic material is continuously extruded through the orifices of the die ring in the form of hot thermoplastic rods or strands and are cut into short lengths or pellets by the knives operatively in contact with the die ring. The pelletizer is immersed in water. The pellets are quickly cooled by the water and carried in suspension from the housing to a collection station.

The third embodiment of the present invention relates to a process or a method for preventing material from agglomerating in an pelletizing assembly using the pelletizing assemblies described above.

In an prophetic illustrative example, an ultra low melt viscosity thermoplastic polymer having a melt viscosity of 300,000 or lower measure by Brookfield Viscometer using ASTM D2556 at 350° F., and a melt index of about 100 dg/min or higher measured by ASTM 1238 condition E at 190° C. and 2.16 kg wt. is extruded using a pelletizer according to the present invention. Specifically, a polymeric feedstock comprising an ultra low melt viscosity thermoplastic butene-1-ethylene copolymer consisting essentially of (i) from about 92 wt % to about 98 wt % of butene-1 and (ii) from about 2 wt % to about 8 wt % of ethylene is extruded using the pelletizer in the first embodiment of the present invention. The underwater pelletizer will produce ultra low viscosity polymer pellets without shut-down of the extrusion/pelletization line due to plug-up of the pelletizer for an extensive period of time. This will compare favorable over the prior art pelletizer described in the Background of Invention.

In each of the foregoing embodiments, the number of blades of the rotary cutter member should by no means be limited to the illustrated examples and may be any other number which is more than one.

The ranges and limitations provided in the instant specification and claims are those which are believed to particularly point out a distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A pelletizing assembly for pelletizing an extruded material, said pelletizing assembly comprising:
   an extrusion die plate comprising:
     a die face at downstream side of the die plate;
     a die ring formed on the downstream side of the die face having a wear surface projecting outwardly from the die face to form a recess in center of die ring; and
     a channel means extending from upstream side of the die plate and the die ring to the die face adapted to deliver the extruded material from the upstream side of the die plate to the die face for extrusion, and said channel means forming an orifice in the die ring for extruded material to exit the die plate;
   a cutting assembly mounted for rotation adjacent the die face, said cutting assembly comprising:
     a hub attachable to a driving shaft for rotation in spaced relation with the die face;
     and
     a cutting element mounted on the hub for rotation therewith, said cutting element having a cutting edge for movement adjacent a downstream surface of the die ring;
   and
   a shroud element fixedly mounted to said die face, said shroud having a surface corresponding to a surface on said cutting assembly such that an interface is established between the cutting assembly and the extrusion die which permits free rotation of the cutting assembly and forms a barrier to prevent pellet from migrating (i) into said recess in center of die ring and between the die face and the hub.

2. The pelletizing assembly as described in claim 1, wherein the hub is a circular plate having a center axis of rotation and rotatable coaxially to the face of the die, said hub having an inner surface facing the die face, an outer surface adjacent the shaft, and an outer periphery; and said die ring has a wear surface projecting outwardly from the die surface to form a recess in center of said die ring, said recess having a bottom surface facing the inner surface of said hub and a side surface, said shroud is fixedly mounted to surface of said recess in the center of the die ring, said shroud element has an outer diameter substantially equal to the inner diameter of said die ring, and an interface is established between the downstream edge of the shroud element and the inner surface of the hub which permits free rotation of the cutting assembly and forms a barrier to prevent pellet migration between inner surface of the hub and the bottom surface of said recess on the die face.

3. The pelletizing assembly as described in claim 2, wherein the outer periphery of the shroud element is held to a minimum clearance to the inner surface of the cutting blades.

4. The pelletizing assembly as described in claim 3, wherein a portion of the shroud facing said hub is wearable against the inner surface of the hub as the cutting assembly is advanced toward the die to compensate for the wearing of the cutting element.

5. The pelletizing assembly as described in claim 4, wherein a portion of the shroud element at the side facing the hub is thinner in width than the remaining portion of the shroud thereby reducing the amount of scrap material generated from wearing of the shroud.

6. The pelletizing assembly as described in claim 2, wherein said shroud is made from a polymer.

7. The pelletizing assembly as described in claim 6, wherein said shroud is made from polyethylene, polypropylene, tetrafluoroethylene fluorocarbon polymers, fluorinated ethylene-propylene resins, polyamides, phenolic resin, polyacrylic polymer, polyester, or polycarbonate.

8. The pelletizing assembly as described in claim 2, wherein:

said cutting blade engages the surface of the die ring at an angle selected from about 10° to about 60°, said cutting blade has a cutting edge parallel to plane of rotation of the hub, the width of the cutting edge of the cutting blade is substantially equal to that of said die ring, said cutting element is a cutting blade having an inner edge contoured to conform in its angular position to curvature of the outer periphery of the shroud and has minimal clearance with the outer periphery of said shroud thereby substantially eliminating the gap between inner surface of cutting blade and the outer periphery of the shroud, and said cutting element has an outside edge contoured substantially concentric to the inner edge so that the width of the cutting edge remains constant as the cutting element wears.

9. An underwater pelletizing assembly for pelletizing thermoplastic material, said pelletizing assembly comprising:

an extrusion die plate comprising:
a die face at downstream side of the die plate;
a die ring formed on the downstream side of the die face having a wear surface projecting outwardly from the die surface to form a recess in center of die ring, and said recess having a bottom surface facing the inner surface of said hub and a side surface; and
a plurality of channels extending from upstream side of the die plate and the die ring to the die face adapted to deliver the extruded material from the upstream side of the die plate to the die face for extrusion, and said channels forming orifices in the die ring for extruded material to exit the die plate;

a rotatable multi-bladed cutting assembly adjacent the die face, said cutting assembly comprising:
a circular hub attachable to a shaft having a center axis of rotation and rotatable coaxially in spaced relation to the die face, said hub having an inner surface facing the die face, an outer surface adjacent the shaft, and an outer periphery,
a plurality of cutting blades affixed to the hub for rotation therewith, said cutting blades having cutting edges for movement adjacent the wear surface of the die ring, said cutting blades engage the surface of the die ring at an angle selected from about 10° to about 60°, said cutting blades having cutting edges parallel to plane of rotation of the hub, the width of the cutting edges of the cutting blades being substantially equal to that of said die ring;

and a shroud fixedly mounted to surface of said recess in the center of the die ring, said shroud element having an outer diameter substantially equal to the inner diameter of said die ring, an interface being established between the downstream edge of the shroud element and the inner surface of the hub which permits free rotation of the cutting assembly and forms a barrier to prevent pellet migration between inner surface of the hub and the bottom surface of said recess on the die face, the outer periphery of the shroud being held to a minimum clearance to the inner surface of the cutting blades, a portion of the shroud facing the hub being wearable against inner surface of the hub as the cutting assembly is advanced toward the die to compensate for the wearing of the cutting element;

wherein said cutting blades having inner surfaces contoured to conform in their angular positions to curvature of the outer periphery of the shroud and outer periphery of the hub and have minimal clearance with the outer periphery of said shroud and the outer periphery of said hub thereby substantially eliminating the gap between the inner surfaces of the cutting blades and the outer periphery of the shroud and the outer periphery of the hub;

wherein said cutting element has an outside edge contoured substantially concentric to the inner edge so that the width of the cutting edge remains constant as the cutting element wears.

10. The underwater pelletizing assembly as described in claim 9, wherein said cutting blades engage the surface of the die ring at an angle selected from about 30° to about 36°.

11. The pelletizing assembly as described in claim 10, wherein said shroud is made from polyethylene, polypropylene, tetrafluoroethylene fluorocarbon polymers, fluorinated ethylene-propylene resins, polyamide, phenolic resin, polyacrylic polymer, polyester, or polycarbonate.

12. The pelletizing assembly as described in claim 1, wherein said shroud element is a cup-shaped element covering both the bottom surface and side surface of said recess.

13. The pelletizing assembly as described in claim 1, wherein said shroud element is a skirt shaped element mounted to the side surface of the recess.

* * * * *